(No Model.)
H. BARBER.
SPRING DRAFT ATTACHMENT.
No. 411,851. Patented Oct. 1, 1889.
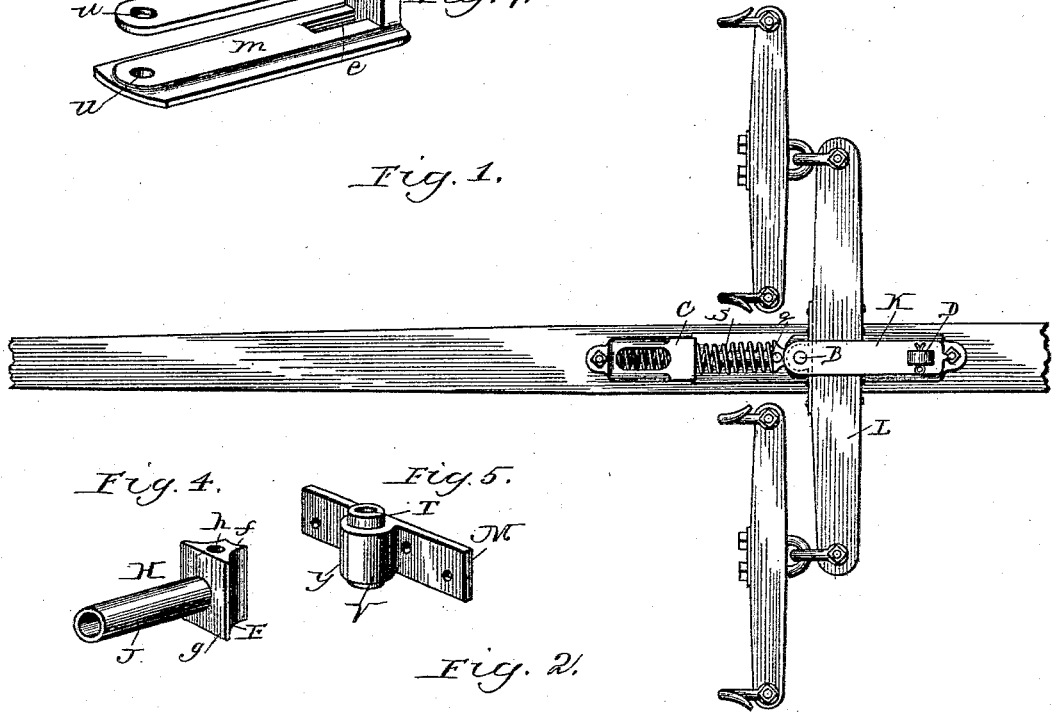

UNITED STATES PATENT OFFICE.

HIRAM BARBER, OF CHICAGO, ILLINOIS.

SPRING-DRAFT ATTACHMENT.

SPECIFICATION forming part of Letters Patent No. 411,851, dated October 1, 1889.

Application filed December 14, 1888. Serial No. 293,603. (No model.)

*To all whom it may concern:*

Be it known that I, HIRAM BARBER, a citizen of the United States, residing at Chicago, in the county of Cook and State of Illinois, have invented a certain new and useful Improvement in Spring-Draft Attachments for use on Wagons and other Vehicles, of which the following is a full, clear, concise, and exact description, reference being had to the accompanying drawings, forming a part of this specification.

The object of my invention is to secure a yielding connection between the evener and the fixed point of draft upon a wagon or other vehicle. The advantages of this arrangement are very great. The spring in such a device receives the shock precisely as the spring under the seat of the occupant of a wagon or other vehicle. When the draft animal pulls upon a fixed bolt or pivot there is nothing to relieve it from the full force of the concussion when the vehicle passes over rough or uneven surfaces, and the assault upon the vital force of the animal is continued. By the use of a spring-draft attachment this constant draft upon the nervous or vital force or energy is reduced to the minimum.

In the drawings, Figure 1 is a plan view of my spring-draft attachment in position upon the pole of a vehicle. Fig. 2 is a sectional view thereof on the dotted line 1 1 of Fig. 3. Fig. 3 is a plan view without the evener. Fig. 4 is a perspective view of the head-block H, provided with the head F and shank J. Fig. 5 is a perspective view of the evener-plate M, provided with the sleeve V, and showing the extremities of the thimble T, which operates in the sleeve V. Fig. 6 is a plan view of a modified form of my spring-draft attachment. Fig. 7 is a perspective view of the clevis K, shown in Figs. 1, 2, and 3. Fig. 8 is a perspective view of the clevis K in the modified form of my attachment. Fig. 9 is a like view of the block R in the clevis K'.

In the construction of my spring-draft attachment the plate A is provided with the casing C, which is firmly attached to the forward end thereof. The plate A is also provided with the central longitudinal slot I, (shown in dotted lines, Fig. 3,) said slot extending from the rear end of the casing C to the rear end of plate A, and serving as a track in which the strap P and the lower ends of the bolt B, standard D, and bolt E have free forward and backward motion. The forward portion of the slot I is somewhat wider than the rear portion thereof, since the thickness of the evener part of the standard D is less than the diameter of the bolt B. This variation of the bolt is not material and the slot I may be of uniform width, and the thickness of the lower end of the standard and the width of the strap P increased accordingly. The standard D and the bolt B are united by the strap P, and are inserted from below through the slot I, the strap P extending longitudinally in the slot with the upper surface thereof flush with the upper surface of plate A. The strap P is supported in position by the plate $z$, which is attached horizontally to the under side of the plate A immediately in rear of the lower end of bolt B. Said bolt B and the standard D are provided with the heads $d\,d$, running horizontally across the slot I and having a bearing on the under surface of the plate A on each side of said slot.

The head-block H is provided with the shank J and a head F, said head being provided with the concave face $f$ and the perpendicular aperture $h$ for the passage of the shank of the bolt E. The lower surface of the head F when in position rests upon the upper surface of the plate A, with the shank $j$ of head-block H extending forward. The head F is securely fastened to the plate A by the bolt E. The lower end of said bolt is provided with the head $d'$, the upper portion of which is made to fit and move in the slot I, while the lower portion thereof is wider than said slot and has an upward bearing against the plate A on each side of the slot. The upper end of the bolt E is provided with a nut $q$. While thus securely held in position on the upper surface of the plate A, the head-block H still has freedom of movement forward and backward upon the plate A, the upper section of the head $d'$ moving in the slot I.

When in position, the casing C furnishes a secure chamber for the holding of the forward end of the coil-spring S, while the rear end of the same is held by the shank J of the head-block H, which penetrates and operates in the core thereof, the face of the head F pressing against the rear end of the coil-spring S. When, therefore, sufficient forward pressure is brought against the rear face $f$ of the head F of the head-block H, the front face $g$ thereof is driven against the rear end of the coil-spring S, and the same is compressed according to the measure of the force applied, and I thus secure the first step toward a yielding connection between the draft-animal and the fixed point of draft.

The next step is to secure a practical connection of the evener with the device, as above described, and this is obtained in the following manner: The plate M, which is attached to the front face of the evener L, is provided with the sleeve V for the reception of the thimble T, which is free to turn therein. The upper and lower plates $m\ m$ of the clevis K, are provided with suitable registering openings $e\ e$ in the rear ends thereof for the passage of the standard D, and also suitable registering openings $u\ u$ in the forward ends thereof for the reception of the extremities of thimble T. The longitudinal opening of thimble T is fitted to receive the upright portion of the bolt B, which is held and operates therein. When, therefore, the evener L, with the plate M firmly attached to the front face thereof, is inserted between the upper and lower plates $m\ m$ of the clevis K, and the thimble T inserted in the sleeve V, with the extremities resting, respectively, in the corresponding apertures $u\ u$ provided therefor in the forward ends of the plates $m\ m$, the clevis K is securely fastened to the evener L, and I may then set the clevis K, with the evener L held firmly therein, squarely on the upper surface of plate A, the bolt B passing through the thimble T and the standard D through the corresponding apertures $e\ e$, prepared therefor in the rear ends of the plates $m\ m$, the convex plate $y$ of the sleeve V fitting against the rear concave face $f$ of the head F of the head-block H, and thus the method is completed, for, as is seen, the bolt B and standard D, united by the strap P, have free forward and backward movement in the slot I, and when therefore forward draft is applied to the evener L, the face of the sleeve V is pressed against the face $f$ of the head F and the coil-spring S compressed according to the degree of pressure, while at the same time the turning motion of the evener L is preserved by the free movement of the thimble T within the sleeve V. By this arrangement it will be observed that the evener L, with the clevis K fastened thereto, may be readily disconnected or removed from the vehicle for detached service.

By removing the pin $k$ the evener L may be raised with the clevis K and removed at pleasure and returned to place with equal facility. The advantages of this arrangement will be apparent when it is remembered that in many classes of teaming the detached use of the evener is constantly occurring, and the presence of a clevis or a staple on the evener is indispensable. When in place, the steadiness of the evener is secured by the heads $d\ d$, respectively, of the bolt B and the standard D, while the apertures $e\ e$ in the rear ends of the plates $m\ m$ are at a sufficient distance from the evener L to permit the necessary freedom of motion when the evener is turned upon the thimble T.

In the modified form of my spring-draft attachment shown in Fig. 6 the rear face of the head F′ of the head-block H′ is plane on its surface. In lieu of the sleeve V and the thimble T, the upper and lower plates $m'\ m'$ of the clevis K′ are united at the forward end of the block R. The base of this block is a plane surface, and it is placed in contact with the rear face of the head F′ of the head-block H′. The apex of the block R is convex and is provided with the aperture $r$, corresponding with the apertures $r\ r$ in the plates $m'\ m'$ in the clevis K′, for the passage of the bolt B.

It is evident that the block R may be made integral with the plates $m'\ m'$ in the construction of the clevis K′. It is also obvious that the form of the base thereof may be varied in any degree from the plane face to the oval or convex. The plane face is the preferable form, since it affords a broad bearing, and thus secures the steadiness of the evener. In the modified form of my spring-draft attachment the evener L is held in the clevis K′ by the bolt $n$, upon which it is free to turn. Said bolt has free forward and backward movement in corresponding slots $i\ i$ in the plates $m'\ m'$ of the clevis. These slots are of sufficient length to permit the advance of a front face of the evener L against the convex face of the block R, and upon which the evener L plays when forward draft is applied to the same.

Having thus described my invention, what I claim, and desire to secure by Letters Patent, is—

1. In a draft-equalizer, the combination, with the draft-pole, of a clevis adapted to have a longitudinal motion relatively thereto, an evener pivotally connected with said clevis, a head-block adapted to have a longitudinal motion in unison with the evener and clevis, and a coiled spring located between said head-block and a fixed point of bearing, said spring serving as a yielding connection between the evener, clevis, and head-block, and the draft-pole, substantially as specified.

2. In a draft-equalizer, the combination, with the draft-pole, of a plate secured thereto, a clevis adapted to have a sliding motion thereon, and guided in its movements by said plate and evener having a pivotal connection with the clevis, a head-block adapted to have a sliding motion on the plate, and guided thereby, a coiled spring having one end bearing upon a rigid support attached to the forward end of the plate, and its other end bearing upon the head-block, said spring serving as a yielding connection between the clevis, the evener, the head-block, and the draft-pole, when a forward draft is brought upon said evener, substantially as specified.

3. In a draft-equalizer, the combination, with the draft-pole, of a plate secured thereto, a clevis $g$ adapted to have a longitudinal movement relatively to said plate, said plate being slotted to serve as a guide for the clevis, and adapted to impart the longitudinal movement to the clevis when draft is applied, a head-block adapted to have a sliding movement upon the plate in unison with that of the clevis and evener, and guided in its movements by the plate, and a coiled spring located between the head-block and a fixed point of bearing on the plate, substantially as specified.

4. In a draft-equalizer, the combination, with the draft-pole, of a longitudinally-slotted plate A, a clevis K, having the upper and lower parts $m\ m$, provided with corresponding eyes or openings at its rear and forward ends, the evener L passing through the clevis, and provided with the plate M, having the sleeve V, the thimble T, passing through the sleeve, and the forward openings of the plates $m\ m$, the standard D, and bolt B, united by the strap P, said standard passing through the rear openings of the plates $m\ m$, and the bolt passing through the thimble T, the head-block H, having a head F, and a shank J, said head-block being adapted to have a sliding movement on the plate A, and guided in said movement by the slot therein, the casing C, secured to the forward end of the plate, and a coiled spring located between said casing and the head of the head-block, said parts being arranged for co-operation, substantially as described, and for the purposes specified.

In witness whereof I have hereunto subscribed my name this 11th day of December, A. D. 1888.

HIRAM BARBER.

Witnesses:
BARBARA SCHOTTLER,
SAMUEL B. FOSTER.